United States Patent Office 3,193,459
Patented July 6, 1965

3,193,459
STEROID HEMISUCCINATE COMPOSITIONS AND METHOD FOR EXTEMPORANEOUS ADMINISTRATION
Jerome Kerman, Portage Township, Kalamazoo County, and John A. Hogg, Kalamazoo Township, Kalamazoo County, Mich., assignors to The Upjohn Company, Kalamazoo, Mich., a corporation of Michigan
No Drawing. Filed July 1, 1955, Ser. No. 519,633
4 Claims. (Cl. 167—77)

This application is a continuation-in-part of our co-pending applications, S.N. 485,316, filed January 31, 1955, and S.N. 510,519, filed May 23, 1955, both now abandoned.

This invention relates to a novel composition of matter and to a process and is particularly directed to physiologically active, water-soluble derivatives of $\Delta^1$-cortisone and $\Delta^1$-hydrocortisone and the 9$\alpha$-halo derivatives thereof having the formula:

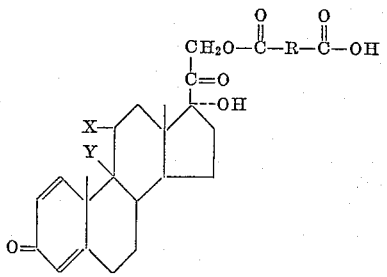

wherein X is an oxo or hydroxy group, Y is a halogen, and R is the radical of a dicarboxylic inner anhydride, as hereinafter defined, and the salts thereof, and to compositions thereof suitable for topical and intravenous application and administration.

$\Delta^1$-cortisone and $\Delta^1$-hydrocortisone respectively identify 17$\alpha$,21-dihydroxy-$\Delta^{1,4}$-pregnadiene-3,11,20-trione and 11$\beta$,17$\alpha$,21-trihydroxy-$\Delta^{1,4}$-pregnadiene-3,20-dione. They are trivial names synonymous respectively with prednisone and prednisolone. Thorne et al., Ann. Int. Med. 43, 979 (1955); Ely et al., Proc. Soc. Ext. Biol. Med., 91, 503 (1956).

$\Delta^1$-cortisone and $\Delta^1$-hydrocortisone and the 9$\alpha$-halo derivatives thereof alone or in combination with other drugs are useful for the control of inflammatory conditions and adrenocortical insufficiency. No entirely satisfactory prepaartion, however, has been available heretofore for the treatment of emergency conditions such as lupus erythematosus in relapse, Addisonian crisis, the Waterhouse-Friderichsen syndrome, emergency surgery, acute hypersensitive reactions, bi-lateral adrenalactomy, and other forms of acute adrenocortical insufficiencies. Nor have entirely satisfactory water-soluble derivatives and/or preparations been available for any purpose.

It is an object of the invention to provide new and useful compositions of matter. It is a further object of the invention to prepare physiologically active derivatives of $\Delta^1$-cortisone and $\Delta^1$-hydrocortisone and the 9$\alpha$-halo derivatives thereof which can be administered parenternally, orally, or topically without difficulty and from which the $\Delta^1$-cortisone and $\Delta^1$-hydrocortisone activity is rapidly made available for its intended function. It is a further object of the invention to prepare novel compositions of physiologically active derivatives of $\Delta^1$-cortisone and $\Delta^1$-hydrocortisone and the 9$\alpha$-halo derivatives thereof which can be administered intravenously without difficulty and without requiring the use of special equipment or supervision and are suitable for extemporaneous and emergency use outside of hospitals. It is a further object of the invention to provide compositions of matter suitable for extemporaneous preparation of aqueous solutions containing a physiologically active, water-soluble derivative of $\Delta^1$-cortisone and $\Delta^1$-hydrocortisone and the 9$\alpha$-halo derivatives thereof. It is a further object of the invention to provide stable aqueous solutions of a physiologically active, water-soluble derivative of a $\Delta^1$-cortisone and $\Delta^1$-hydrocortisone and the 9$\alpha$-halo derivatives thereof. It is a further object of the invention to avoid the disadvantages of the prior art and to obtain advantages as will be more particularly pointed out. Still other objects will become apparent as the description proceeds.

The compounds of the invention are prepared by reacting $\Delta^1$-cortisone and $\Delta^1$-hydrocortisone and the 9$\alpha$-halo derivatives thereof with a dicarboxylic inner anhydride according to the following equation:

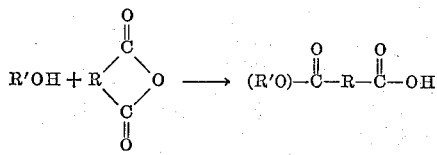

in which R'OH is one of $\Delta^1$-cortisone and $\Delta^1$-hydrocortisone and the 9$\alpha$-halo derivative thereof, and R is the radical of a dicarboxylic inner anhydride. The term "dicarboxylic inner anhydride" is used herein to designate anhydrides as represented above which are obtained by intramolecular abstraction of water from the two carboxyl groups of a dicarboxylic acid. Thus R is the radical obtained by the removal of the two carboxyl groups from a dicarboxylic acid which is capable of being dehydrated to an inner anhydride.

Advantageously the acid esters are converted to their water-soluble salts, such as alkali and alkaline earth metal salts and ammonium salts (substituted and unsubstituted). Sterile aqueous solutions of these salts also are suitable for intravenous administration in accordance with this invention and have the advantage that more concentrated solutions can be formed.

Advantageously the aqueous solutions thus prepared are buffered with a neutral buffer, such as a phosphate buffer adjusted to neutrality. On hydrolysis of the esters of the invention, the liberated acid salt, unless neutralized by a neutral buffer, reacts with the ester salt, thereby freeing the relatively insoluble ester-acid. Thus aqueous solutions according to the invention desirably are stabilized by means of a neutral buffer.

To further improve the stability, the compounds of the invention are most suitably packaged as dry compositions. Advantageously an aqueous solution is sterilized by filtration and then lyophilized to give a dry, stable precipitate. The sterile solutions advantageously are lyophilized in sterile vials to which sterile aqueous vehicle can be added at the time of use for preparing sterile aqueous solutions suitable for intravenous injection. Suitably these vials can have a rubber cap which can be punctured by a hypodermic needle to introduce the sterile aqueous vehicle. Suitably also the sterile aqueous vehicle and the dry precipitate can be packaged in the separate compartments of a dual cartridge suitable for use in hypodermic syringes designed for first mixing a solid with a solvent and for thereafter injecting the solution thus formed into the patient.

Compositions most suitably adapted for use in preparing solutions for intravenous injection are obtained by coprecipitating the esters of the invention with a neutral buffer salt. Thus to an aqueous solution of the water-soluble ester-salt, there is added a phosphate buffer adjusted to neutrality, that is, to a pH of 6.5 to 8.0. The solution is then filter-sterilized and lyophilized in a suitable vial, as described above, to give a dry powder of coprecipitated ester according to the invention, and neutral buffer salt.

In carrying out the process according to the invention, the free alcohol is reacted with an excess of a carboxylic inner anhydride in a mutual solvent, advantageously, an organic base such as pyridine or lutidine. The reaction normally takes place within a few hours at room temperature. Gentle heating can be used but is generally undesirable. Also if the anhydride is sufficiently active or if a longer time is used, temperatures below room temperature can be used.

The product ester can be recovered from the reaction mixture by the usual procedures. Advantageously the product is precipitated by adding a liquid which is capable of precipitating the product as the free acid ester or a salt thereof. An aqueous solution of hydrochloric acid or like strong mineral acid can be used advantageously when pyridine or like organic base is used as the mutual solvent. Ordinarily it will be sufficient to pour the reaction mixture slowly into an excess of aqueous hydrochloric acid and then to filter the precipitated product. The product can then be further purified by crystallization from a polar solvent such as acetone. Suitable other solvents include: methyl ethyl ketone, isopropyl alcohol, ethanol, and combinations of these with Skellysolve B, and isopropyl alcohol and water.

The free acid ester thus produced can be converted to a salt by neutralization with the appropriate base. Advantageously the free acid ester can be dissolved in a volatile water-miscible solvent, such as acetone, and the solution neutralized by adding aqueous alkali or alcoholic alkali. Advantageously the pH is adjusted to about 7.2 to about 7.4. Other volatile water-miscible solvents include: tetrahydrofuran, dioxane, and 2-propanol. The solvent is then removed by vacuum distillation, first the volatile solvent and then the water. Advantageously, the water is removed by lyophilization. Before lyophilization the water solution can be filtered-sterilized if a sterile product is desired. Suitable alkali are the alkali and alkaline earth metal hydroxides and carbonates, such as sodium, potassium, ammonium, calcium, and magnesium hydroxides and carbonates and lower molecular weight ammonium bases such as are more particularly enumerated below.

According to a preferred procedure a buffer salt is incorporated in the aqueous solution of the ester-salt obtained by removal of the volatile solvent so that the ester-salt and the buffer are coprecipitated during the lyophilization or otherwise removal of the water. As buffers, suitable quantities of mono- and disodium orthophosphates can be dissolved in the aqueous solution of ester-salt and the pH adjusted to the desired value. If salts other than the sodium ester-salt is desired, the corresponding bases or phosphate salts are used. Other acids having a weakly acidic function having a pKa close to the desired pH of 6.5 to 8.0 can be used in place of the phosphoric acid in accordance with the well recognized principles of buffering.

In preparing compounds according to the invention, any dicarboxylic inner anhydride can be used. It is well known that dicarboxylic inner anhydrides as a class are alcoholized readily by compounds having active hydroxyl hydrogen to form acid esters and it has been found according to this invention that such an alcoholysis is also obtained with $\Delta^1$-cortisone and $\Delta^1$-hydrocortisone and the $9\alpha$-halo derivatives thereof to give $\Delta^1$-cortisone and $\Delta^1$-hydrocortisone half esters and the $9\alpha$-halo derivatives thereof. As is well known, the dicarboxylic inner anhydrides which so react can contain a five-, six-, or seven-membered ring structure, such as are exemplified by succinic anhydride, glutaric anhydride, and adipic anhydrides, respectively, and the corresponding unsaturates such as maleic anhydride, which ring structure can be substituted by alkyl, alkenyl, alkylidene, alkoxy, carboxy, aralkyl, aryl, cycloalkyl, cycloalkenyl, and halo groups, or can comprise bicyclic and polycyclic groups such as are obtained by the diene synthesis from maleic anhydride and conjugated olefins such as butadiene, cyclopentadiene, furan, and the like. Representative dicarboxylic inner anhydrides include succinic anhydride and derivatives thereof, such as, methylsuccinic anhydride, dimethylsuccinic anhydride (symmetrical and unsymmetrical), mono-, di-, chloro-, and bromosuccinic anhydrides, $\alpha,\beta$-dichloro-$\alpha,\beta$-dimethylsuccinic anhydride, $\alpha,\beta$-dimethoxysuccinic anhydride, $\alpha,\beta$-diethoxysuccinic anhydride, methoxysuccinic anhydride, ethoxysuccinic anhydride, itaconic anhydride, homoitaconic anhydride, benzylsuccinic anhydride, 2,4-dimethoxyphenylsuccinic anhydride, N-benzoylaspartic anhydride, phenylsuccinic anhydride, cyclohexylsuccinic anhydride, cyclohexenylsuccinic anhydride, cyclopentylsuccinic anhydride, and alkenylsuccinic anhydrides, such as allylsuccinic anhydride, isobutenylsuccinic anhydride, octenylsuccinic anhydrides, e.g., diisobutenylsuccinic anhydride, nonenylsuccinic anhydrides, e.g., tripropenylsuccinic anhydride, 3-phenylallylsuccinic anhydride, 2,5-hexadien-1-yl-succinic anhydride, and the like; maleic anhydride and derivatives thereof, such as citraconic anhydride, homocitraconic anhydride (ethylmaleic anhydride), pyrocinchonic anhydride (dimethylmaleic anhydride), xeronic anhydride (diethylmaleic anhydride), ethoxymaleic anhydride, phenyl and p-chlorophenylmaleic anhydride, chloromaleic anhydride, dichloromaleic anhydride, and ethylmethylmaleic anhydride; aconitic anhydride and tricarballylic anhydride; phthalic anhydride and derivatives thereof, such as hexahydrophthalic anhydride, $\Delta^4$-cis-tetrahydrophthalic anhydride, endo-cis-bicyclo[2.2.1]-5-heptane-2,3-dicarboxylic anhydride, 7-oxabicyclo[2.2.1]-5-heptane-2,3-dicarboxylic anhydride (furan-maleic anhydride adduct), pyromellitic anhydride, and the like; naphthalic anhydride; diglycolic anhydride; thiodiglycolic anhydride; cyclobutane-1,2-dicarboxylic anhydride; iminodiacetic anhydride (diglycoloimide); 3-terpinolenesuccinic anhydride; 3,5-diethoxy-2,4-cyclohexadiene-1,2-dicarboxylic anhydride; 1,2,3,4-tetrahydro-3-methyl-6,7-methylenedioxy-1,2-naphthalene dicarboxylic anhydride (the maleic anhydride adduct of isosafrole); homophthalic anhydride; cinchomeronic anhydride; quinolinic anhydride; 4-tertiarybutyl-mercapto-5-methyl-4-cyclohexene-1,2-dicarboxylic anhydride; 1,2-cyclopentanedicarboxylic anhydride; 1,2-dimethyl-1,2-cyclopropanedicarboxylic anhydride; 1-cyclopentene-1,2-dicarboxylic anhydride, and the like; glutaric anhydride, $\alpha$-methylglutaric anhydride, $\beta$-methylglutaric anhydride, $\alpha$-ethylglutaric anhydride, $\beta$-ethylglutaric anhydride, $\alpha,\alpha$-dimethylglutaric anhydride, $\alpha,\beta$-dimethylglutaric anhydride, $\alpha,\gamma$-dimethylglutaric anhydride, $\beta,\beta$-dimethylglutaric anhydride, $\alpha$-isopropylglutaric anhydride, $\beta$-isopropylglutaric anhydride, $\alpha$-propylglutaric anhydride, $\beta$-propylglutaric anhydride, $\alpha$-ethyl-$\beta$-methylglutaric anhydride, $\beta$-ethyl-$\beta$-methylglutaric anhydride, $\alpha,\alpha,\beta$-trimethylglutaric anhydride, $\alpha,\alpha,\gamma$-trimethylglutaric anhydride, $\alpha,\beta,\beta$-trimethylglutaric anhydride, $\alpha,\beta,\gamma$-trimethylglutaric anhydride, $\beta$-isobutylglutaric anhydride, $\alpha,\alpha$-diethylglutaric anhydride, $\alpha$-methyl-$\beta$-isopropylglutaric anhydride, $\beta$-methyl-$\beta$-isopropylglutaric anhydride, $\alpha$-ethyl-$\beta,\beta$-dimethylglutaric anhydride, $\alpha,\alpha,\beta,\beta$-tetramethylglutaric anhydride, $\alpha,\alpha,\gamma,\gamma$-tetramethylglutaric anhydride, $\alpha,\beta,\beta,\gamma$-tetramethylglutaric anhydride, $\beta$-amylglutaric anhydride, $\alpha$-methyl-$\gamma$-isobutylglutaric anhydride, $\beta$-ethyl-$\beta$-propylglutaric anhydride, $\beta$-methyl-$\beta$-butylglutaric anhydride, $\beta$-methyl-$\beta$-isobutylglutaric anhydride, and the like.

From the examples given above, it will be seen that R can be exemplified by the groups;

—CH$_2$—CH$_2$—
—CH$_2$—CH$_2$—CH$_2$—
—CH$_2$—CH$_2$—CH$_2$—CH$_2$—
—CH=CH—
—CH$_2$—O—CH$_2$—
—CH$_2$—S—CH$_2$—, and
—CH$_2$—NH—CH$_2$— wherein hydrogen can be replaced by alkyl, alkenyl, alkylidene, alkoxy, carboxy, cycloalkyl, cycloalkenyl, aryl, aralkyl, and halo groups, advantageously containing not more than eight carbon atoms; and wherein vicinal carbon atoms can be linked together by a polyvalent radical forming therewith a cyclic structure which can be mono- or polycyclic, carbocyclic or heterocyclic, or mixed carbocyclic and heterocylic structures as exemplified above. The polyvalent radical can be exemplified by the following groups:

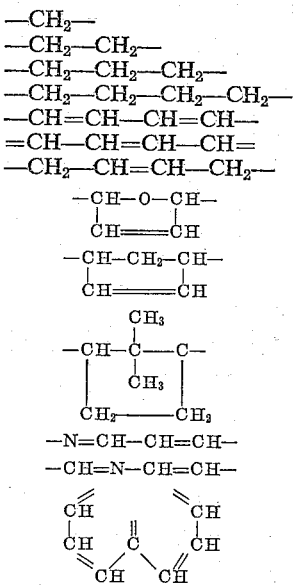

In the presence of a base, salts are formed. Thus the compounds of the invention form salts with the alkali metal and alkaline earth metal bases such as sodium, potassium, lithium, ammonium, calcium, barium, strontium, and magnesium hydroxides and carbonates, and basic amines such as mono-, di-, and trimethylamines; mono-, di-, and triethylamines; mono-, di-, and triisopropylamines; ethyldimethylamine; benzyldiethylamine; cyclohexylamine; dibenzylamine; and like N,N'-dibenzylethylene diamine; bis-ortho-methoxy-N-methyl ortho-phenylisopropylamine; methoxyphenylisopropylamine; lower-aliphatic, lower-cycloaliphatic, and lower-araliphatic amines up to and including about eight carbon atoms; heterocyclic amines such as piperidine, morpholine, pyrrolidine, piperazine; and the lower-alkyl derivatives thereof, such as 1-methylpiperidine, 4-ethylmorpholine, 1-isopropylpyrrolidine, 1,4-dimethylpiperazine, 1-n-butylpiperidine, 2-methylpiperidine, 1-ethyl-2-methylpiperidine, and the like. Amines containing water-solubilizing or hydrophilic groups such as mono-, di-, and triethanolamines, and galactamine, N-methyl glucamine, N-methyl glucosamine, ephedrine, phenylephrine, epinephrine, procaine, and the like.

The following examples are illustrative of the process and products of the invention but are not to be construed as limiting.

*Example 1.—$\Delta^1$-hydrocortisone 12-hemisuccinate*

To a stirred solution of 2.54 grams of succinic anhydride in 25.4 milliliters of pyridine was added 2.0 grams of $\Delta^1$-hydrocortisone. Stirring was continued until the $\Delta^1$-hydrocortisone was completely dissolved. After standing overnight the reaction mixture was slowly poured into a vigorously stirred mixture of thirty milliliters of concentrated hydrochloric acid, 102 milliliters of water and 127 grams of ice. Stirring was continued for one hour and the crude crystalline, $\Delta^1$-hydrocortisone 21-hemisuccinate, was separated by filtration. The product was washed on the filter with water until the filtrate had a pH of 4.0. After drying the product weighed 2.38 grams (93.2 percent of theory), melting point 198–206.5 degrees centigrade. After recrystallization from 45 milliliters of methyl ethyl ketone and 36 milliliters of Skellysolve B the product weighed 2.24 grams (87 percent of theory), melting point 206.5–209.5 degrees centigrade, $[\alpha]_D^{25}+117$ degrees (0.4 percent in 95 percent ethanol).

*Example 2.—$\Delta^1$-hydrocortisone 21-hemisuccinate sodium salt*

Sodium hydroxide solution (0.1 normal) was slowly added to a stirred solution of 1.95 grams of $\Delta^1$-hydrocortisone 21-hemisuccinate in fifty milliliters of acetone until the pH rose to 7.4. During the addition of NaOH solution, 100 milliliters of water was also added.

The solution was concentrated at 25 degree centigrade under vacuum to remove the acetone. The resulting aqueous solution of $\Delta^1$-hydrocortisone 21-hemisuccinate sodium salt was filtered and freeze-dried. Yield—2.01 grams (99.5 percent of theory).

*Example 3.—$\Delta^1$-cortisone 21-hemisuccinate*

To a stirred solution of 3.0 grams of succinic anhydride in thirty milliliters of pyridine was added 2.95 grams of $\Delta^1$-cortisone. Stirring was continued until the $\Delta^1$-cortisone was completely dissolved. After standing overnight, the reaction mixture was slowly poured into a vigorously stirred mixture of 36 milliliters of concentrated hydrochloric acid, 120 milliliters of water, and 150 grams of ice. Stirring was continued for one hour and the crude crystalline $\Delta^1$-cortisone 21-hemisuccinate was separated by filtration. The product was washed on the filter with water until the filtrate had a pH of 4.0. After drying the product weighed 3.53 grams (93.6 percent of theory).

After crystallization by dissolving in 100 milliliters of hot acetone, concentrating to 21 milliliters and cooling, the product weighed 2.75 grams (73 percent of theory), melting point 205–8 degrees centigrade; $E_1^{243.5}$ 15,275; $[\alpha]_D+89$ degrees (one percent in 95 percent ethanol).

*Example 4.—$\Delta^1$-cortisone 21-hemisuccinate sodium salt*

Sodium hydroxide solution (0.1 normal) was slowly added to a stirred solution of 2.60 grams of $\Delta^1$-cortisone 21-hemisuccinate in 100 milliliters of acetone until the pH rose to 7.4. During the addition of NaOH solution, 100 milliliters of water was also added.

The solution was concentrated at 25 degrees centigrade under vacuum to remove the acetone. The resulting aqueous solution of $\Delta^1$-cortisone 21-hemisuccinate sodium salt was filtered and freeze-dried. Yield—2.67 grams (97.8 percent of theory).

*Example 5.—N-methylglucamine salt of $\Delta^1$-hydrocortisone 21-hemisuccinate*

A solution is prepared by dissolving nine grams of $\Delta^1$-hydrocortisone 21-hemisuccinate and 3.82 grams of N-methylglucamine in 25 milliliters of water. An additional 200 milligrams of $\Delta^1$-hydrocortisone 21-hemisuccinate is then added and the suspension stirred for ten minutes and filtered. The solution is then lyophilized. Following this procedure the N-methylglucamine salt of $\Delta^1$-hydrocortisone 21-hemisuccinate is obtained.

*Example 6.—Galactamine salt of $\Delta^1$-hydrocortisone 21-hemisuccinate*

A solution is prepared by dissolving 100 milligrams of $\Delta^1$-hydrocortisone 21-hemisuccinate and 39 milligrams of galactamine in ten milliliters of boiling methanol. The methanol is evaporated, the residue taken up in five milliliters of water and the water solution lyophilized. By this procedure the galactamine salt of $\Delta^1$-hydrocortisone 21-hemisuccinate is obtained.

*Example 7.—Procaine salt of $\Delta^1$-hydrocortisone 21-hemisuccinate*

A solution of 3.25 grams of procaine hydrochloride in 25 milliliters of water and ten milliliters of ten percent aqueous sodium hydroxide was extracted twice with thirty-milliliter portions of methylene chloride. To the sixty milliliters of extract was added ten milliliters of methanol and five grams of Δ¹-hydrocortisone 21-hemisuccinate and the resulting solution evaporated to dryness under vacuum. By this procedure the procaine salt of Δ¹-hydrocortisone 21-hemisuccinate is obtained.

*Example 8.—N,N'-dibenzylethylenediamine salt of Δ¹-hydrocortisone 21-hemisuccinate*

A solution of nine grams of Δ¹-hydrocortisone 21-hemisuccinate and 2.56 grams of N,N'-dibenzylethylenediamine in 100 milliliters of methylene chloride was heated under reflux for ten minutes and then concentrated to a thick syrup and dried under vacuum. By this procedure the N,N'-dibenzylethylenediamine salt of Δ¹-hydrocortisone 21-hemisuccinate is obtained.

*Example 9.—The bis-orthomethoxyphenylisopropylamine salt of Δ¹-hydrocortisone 21-hemisuccinate*

By the procedure of Example 8 using nine grams of Δ¹-hydrocortisone 21-hemisuccinate, 5.8 grams of bis-orthomethoxyphenylisopropylamine, and ninety milliliters of methylene chloride, the bis-orthomethoxyphenylisopropylamine salt of Δ¹-hydrocortisone 21-hemisuccinate is obtained.

*Example 10.—The cyclohexylamine salt of Δ¹-hydrocortisone 21-hemisuccinate*

By the procedure of Example 8 using one gram of Δ¹-hydrocortisone 21-hemisuccinate, 214 milligrams of cyclohexylamine, and twenty milliliters of methylene chloride, the cyclohexylamine salt of hydrocortisone 21-hemisuccinate is obtained.

*Example 11.—The dibenzylamine salt of Δ¹-hydrocortisone 21-hemisuccinate*

By the procedure of Example 8 using one gram of hydrocortisone 21-hemisuccinate, 286 milligrams dibenzylamine, and ten milliliters of methylene chloride, the dibenzylamine salt of Δ¹-hydrocortisone 21-hemisuccinate is obtained.

*Example 12.—The ephedrine salt of Δ¹-hydrocortisone 21-hemisuccinate*

By substituting ephedrien hydrochloride for the procaine hydrochloride of Example 7 there is obtained the ephedrine salt of Δ¹-hydrocortisone 21-hemisuccinate.

*Example 13.—The epinephrine salt of Δ¹-hydrocortisone 21-hemisuccinate*

By substituting the procaine hydrochloide of Example 7 by epinephrine hydrochloride, the epinephrine salt of Δ¹-hydrocortisone 21-hemisuccinate is obtained.

*Example 14.—The phenylephrine salt of Δ¹-hydrocortisone 21-hemisuccinate*

By substituting phenylephrine hydrochloride for procaine hydrochloride in Example 7, the phenylephrine salt of Δ¹-hydrocortisone 21-hemisuccinate is obtained.

*Example 15.—Monoethanolammonium Δ¹-hydrocortisone 21-hemisuccinate*

Following the procedure of Example 1 using monoethanolamine in place of N-methylglucamine, monoethanolammonium Δ¹-hydrocortisone 21-hemisuccinate was obtained.

*Example 16.—Diethanolammonium Δ¹-hydrocortisone 21-hemisuccinate*

Following the procedure of Example 1 using diethanolamine in place of N-methylglucamine, diethanolammonium Δ¹-hydrocortisone 21-hemisuccinate was obtained.

*Example 17.—Triethanolammonium Δ¹-hydrocortisone 21-hemisuccinate*

Following the procedure of Example 1 using triethanolamine in place of N-methylglucamine, triethanolammonium Δ¹-hydrocortisone 21-hemisuccinate was obtained.

*Example 18.—N-butylmonoethanolammonium Δ¹-hydrocortisone 21-hemisuccinate*

Following the procedure of Example 1 using N-butylmonoethanolamine in place of N-methylglucamine, N-butylmonoethanolammonium Δ¹-hydrocortisone 21-hemisuccinate was obtained.

*Example 19.—Ethyldiethanolammonium Δ¹-hydrocortisone 21-hemisuccinate*

Following the procedure of Example 1 using ethyldiethanolamine in place of N-methylglucamine, ethyldiethanolammonium Δ¹-hydrocortisone 21-hemisuccinate was obtained.

*Example 20.—Phenylmonoethanolammonium Δ¹-hydrocortisone 21-hemisuccinate*

Following the procedure of Example 1 using phenylmonoethanolamine in place of N-methylglucamine, phenylmonoethanolammonium Δ¹-hydrocortisone 21-hemisuccinate was obtained.

*Example 21.—p-Tertiaryamylphenyldiethanolammonium Δ¹-hydrocortisone 21-hemisuccinate*

Following the procedure of Example 1 using p-tertiaryamylphenyldiethanolamine in place of N-methylglucamine, p-tertiaryamylphenyldiethanolammonium Δ¹-hydrocortisone 21-hemisuccinate was obtained.

*Example 22.—2-amino-1-butanol salt of Δ¹-hydrocortisone 21-hemisuccinate*

Following the procedure of Example 1 using 2-amino-1-butanol in place of N-methylglucamine, 2-amino-1-butanol salt of Δ¹-hydrocortisone 21-hemisuccinate was obtained.

*Example 23.—2-amino-2-ethyl-1,3-propanediol salt of Δ¹-hydrocortisone 21-hemisuccinate*

Following the procedure of Example 1 using 2-amino-2-ethyl-1,3-propanediol in place of N-methylglucamine, 2-amino-2-ethyl-1,3-propanediol salt of Δ¹-hydrocortisone 21-hemisuccinate was obtained.

*Example 24.—2-amino-2-methyl-1-propanol salt of Δ¹-hydrocortisone 21-hemisuccinate*

Following the procedure of Example 1 using 2-amino-2-methyl-1-propanol in place of N-methylglucamine, 2-amino-2-methyl-1-propanol salt of Δ¹-hydrocortisone 21-hemisuccinate was obtained.

*Example 25.—Tris(hydroxymethyl)aminomethane salt of Δ¹-hydrocortisone 21-hemisuccinate*

Following the procedure of Example 1 using tris(hydroxymethyl)aminomethane in place of N-methylglucamine, tris(hydroxymethyl)aminomethane salt of Δ¹-hydrocortisone 21-hemisuccinate was obtained.

By substituting Δ¹-cortisone 21-hemisuccinate for the Δ¹-hydrocortisone 21-hemisuccinate in Examples 5 through 25, there are obtained the corresponding amine salts of Δ¹-cortisone 21-hemisuccinate.

By substituting Δ¹-hydrocortisone in the foregoing examples by 9α-chloro- and 9α-fluoro-Δ¹-cortisone and 9α-chloro- and 9α-fluoro-Δ¹-hydrocortisone, there are obtained 9α-chloro- and 9α-fluoro-Δ¹-cortisone 21-hemisuccinate and 9α-chloro- and 9α-fluoro-Δ¹-hydrocortisone 21-hemisuccinate, the sodium salt, and the corresponding amine salts thereof.

Following the procedures given in the foregoing examples using the dicarboxylic inner anhydrides listed above, there are obtained the 21-hemimethylsuccinates,
21-hemi-α,β-dimethylsuccinates,
21-hemi-α,α-dimethylsuccinates, 21-hemichlorosuccinates,
21-hemibromosuccinates,
21-hemi-α,β-dichlorosuccinates,
21-hemi-α,β-dibromosuccinates,
21-hemiphenylsuccinates,
21-hemi-α,β-dichloro-α,β-dimethylsuccinates,
21-hemicyclohexylsuccinates,
21-hemicyclopentylsuccinates,
21-hemicyclohexenylsuccinates,
21-hemi-α,β-dimethoxysuccinates,
21-hemi-α,β-diethoxysuccinates,
21-hemimethoxysuccinates,
21-hemiethoxysuccinates,
21-hemiitaconates,
21-hemihomoitaconates,
21-hemibenzylsuccinates,
21-hemiallylsuccinates,
21-hemi-3-phenylallylsuccinates,
21-hemiisobutenylsuccinates,
21-hemitripropenylsuccinates,
21-hemi-2,5-hexadien-1-ylsuccinates,
21-hemicitraconates,
21-hemihomocitraconates,
21-hemipyrocinchonates,
21-hemidimetylmaleates,
21-hemiethylmaleates,
21-hemixeronates,
21-hemiethoxymaleates,
21-hemiphenylmaleates,
21-hemi-p-chlorophenylmaleates,
21-hemichloromaleates,
21-hemidichloromaleates,
21-hemiethylmethylmaleates,
21-hemi-7-oxabicyclo[2.2.1]-5-heptene-2,3-dicarboxylates,
21-hemi-endo-cis-bicyclo[2.2.1]-5-heptene-2,3-dicarboxylates,
diacid pyromellitates,
21-hemihexahydrophthalates,
21-hemiadipates,
21-hemidiglycolates,
21-hemithiodiglycolates,
21-hemicyclobutane-1,2-dicarboxylates,
21-hemiiminodiacetates,
21-hemi-3-terpinolenesuccinates,
21-hemi-2,4-dimethoxyphenylsuccinates,
21-hemi-N-benzoylaspartates,
21-hemi-3,5-diethoxy-2,4-cyclohexadiene-1,2-dicarboxylates,
21-hemi-1,2,3,4-tetrahydro-3-methyl-6,7-methylenedioxy-1,2-naphthalene dicarboxylates,
diacid aconitates,
diacid tricarballylates,
diacid phthalates,
21-hemihomophthalates,
21-hemicinchomeronates,
hydrocortisone 21-hemiquinolinates,
21-hemi-4-tertiarybutylmercapto-5-methyl-4-cyclohexene-1,2-dicarboxylates,
21-hemi-1,2-cyclopentanedicarboxylates,
21-hemi-1,2-dimethyl-1,2-cyclopropanedicarboxylates,
21-hemi-1-cyclopentene-1,2-dicarboxylates,
21-hemi-α-methylglutarates,
21-hemi-α-ethylglutarates,
21-hemi-β-ethylglutarates,
21-hemi-α,α-dimethylglutarates,
21-hemi-α,β-dimethylglutarates,
21-hemi-α,γ-dimethylglutarates,
21-hemi-α-isopropylglutarates,
21-hemi-β-isopropylglutarates,
21-hemi-α-propylglutarates,
21-hemi-β-propylglutarates,
21-hemi-α-ethyl-β-methylglutarates,
21-hemi-β-ethyl-β-methylglutarates,
21-hemi-α,α,β-trimethylglutarates,
21-hemi-α,α,γ-trimethylglutarates,
21-hemi-α,β,β-trimethylglutarates,
21-hemi-α,β,γ-trimethylglutarates,
21-hemi-β-isobutylglutarates,
21-hemi-α,α-diethylglutarates,
21-hemi-α-methyl-β-isopropylglutarates,
21-hemi-β-methyl-β-isopropylglutarates,
21-hemi-α-ethyl-β,β-dimethylglutarates,
21-hemi-α,α,β,β-tetramethylglutarates,
21-hemi-α,α,γ,γ-tetramethylglutarates,
21-hemi-α,β,β,γ-tetramethylglutarates,
21-hemi-β-amylglutarates,
21-hemi-α-methyl-γ-isobutylglutarates,
21-hemi-β-methyl-β-butylglutarates,
21-hemi-β-methyl-β-isobutylglutarates, and 21-hemi-β-ethyl-β-propylglutarates of $\Delta^1$-cortisone, $\Delta^1$-hydrocortisone, 9α-chloro- and 9α-fluoro-$\Delta^1$-cortisone, and 9α-chloro- and 9α-fluoro-$\Delta^1$-hydrocortisone, and alkali metal, alkaline earth metal, and amine salts corresponding to the inorganic and organic bases listed above.

The water-soluble compositions of this invention can be used advantageously for topical applications in the eye since they are not perceptible in the eye and are non-irritating. Solutions buffered with phosphate to a pH of 6.8 to 8.0 and made isotonic with sodium chloride are especially suitable for eye use. Preservatives can be added to these aqueous preparations, such as 0.01 percent Merthiolate (sodium ethylmercurithiosalicylate), 0.5 percent chlorobutanol and 0.5 percent benzyl alcohol. Similar formulations can be used as ear drops, nose drops, and as aerosols for the relief of respiratory difficulties.

For topical application on the skin or in the eye, especially stable and useful compositions can be prepared in the form of a bland nonirritating ointment. A preferred vehicle of this type is a mixture of white petrolatum 3 parts and liquid petrolatum 1 part. A portion of the white petrolatum can be replaced by wool fat to produce a more suitable vehicle which is then composed of about 55 percent white petrolatum, 25 percent white mineral oil and 20 percent wool fat. From such an ointment base the compositions of the invention are released gradually resulting in a more prolonged therapeutic action. In addition, such preparations are stable for long periods of time under normal temperature conditions.

Other types of formulations may also be very useful for external preparations such as dusting powders, oil-in water emulsions, lotions, anhydrous water-soluble ointments (e.g. Carbowaxes or higher molecular weight polyethylene glycols), and the like. The type of formulation will depend on the ultimate use and conditions to which the composition will be subjected. Dusting powders may be formulated in the usual manner using finely powdered ingredients in a suitable inert base such as lactose.

Compositions of the invention may be formulated for administration to body cavities and may include such dosage forms as suppositories, bougies, vaginal creams and ointments, veterinary ointments for mastitis, dental cones, and the like. Here, the addition of one or more antibacterial agents (listed below) to the corticosteroids of the invention is especially useful where infectious microorganisms are present or where an infection may be anticipated.

The particular antibacterial agents that may be used must be compatible with the corticosteroid, must be non-toxic and non-irritating in the area and in the manner in which they are to be used. The suppositories and bougies for human or animal use may be prepared by incorporating the corticosteroid composition of the invention in a suitable hard fat base such as cocoa butter or in a solid water-soluble compound such as the polyethylene glycols solds under the name of Carbowaxes. Alternatively, bougies may be prepared from mixtures of the water-soluble corticosteroid with inert water-soluble materials such as lactose and compressing the powder after suitable granulation technique on a tablet machine with specially shaped punches and dies to produce a bougie of the required size and shape.

Preparations for oral administration of the water-soluble corticosteroids of this invention may comprise tablets, lozenges, gelatine capsules, granules, aqueous solutions dry mixes for dispersion in a suitable aqueous vehicle before use. Especially useful, is the aqueous solution to be taken by mouth and for this purpose is formulated with suitable sweetening, flavoring and coloring agents; for an elixir, alcohol would also be present. The solutions in contrast to the presently available corticosteroid suspensions, assure the patient uniform dosage.

Tablets of the new compositions may conveniently be prepared by moist granulation and compression or granulation by dry compression or "slugging" followed by final compression according to the usual methods of tablets preparation. A suitable buffering agent such as sodium phosphate or sodium citrate may be incorporated.

Effervescent tablets of the water-soluble compositions of this invention are especially suitable since clear solutions can be obtained without difficulty. The usual tartaric acid-citric acid-sodium bicarbonate base is used.

Co-pending application Serial Number 432,776, filed May 27, 1954, now abandoned, discloses the advantages of corticosteroids with ACTH. A particularly useful therapeutic preparation is obtained by combining the water-soluble corticosteroids of this invention with adrenocorticotrophic hormone in solution in sterile distilled water or saline for intravenous use or for injection intramuscularly or subcutaneously. Especially good results can be obtained from such a combination in a 16 percent aqueous solution of non-antigenic pharmaceutical gelatin upon injection intramuscularly or subcutaneously. In a further improvement, the 16 percent gelatin can be replaced by about 35 percent oxypolygelatin.

Other therapeutic materials can be incorporated in formulations containing water-soluble compositions of this invention to form new and very valuable compositions. Such therapeutic materials include antibacterial agents such as penicillins such as penicillin G, penicillin O, procaine penicillin, N,N'-debenzylethylenediamine di-penicillin, and the like, bacitracin, tetracyclin, chlortetracycline, oxytetracycline, chloramphenicol, streptomycin dihydrostreptomycin erythromycin, circulin, endomycin, tyrothricin, gramicidin, and the like, sorbic acid, nitrofurazone, chloroazodin hexachlorophene, undecylenic acid, propionic acid, sodium and/or zinc caprylate, lower alkyl p-hydroxybenzoates, and the like, sulfonamides such as sodium sulfacetamide, sulfisoxazole diethanolamine, 4-aminomethylbenzenesulfonamide hydrochloride, sulfadiazine, sulfamerazine, sulfamethazine, and the like, or mixtures of these antibacterial agents in combination with the selected water-soluble corticosteroid.

Similarly, therapeutic materials such as vitamins, and more particularly thiamine, riboflavin, pyridoxine, ascorbic acid, pantothenic acid, menadione, nicotinamide, folic acid vitamin $B_{12}$, and the like, can be included in an oral or parenteral formulation containing a water-soluble corticosteroid of this invention to form new compositions exhibiting valuable therapeutic properties. Specially useful therapeutic results can be obtained with systematically administered antibiotic such as tetracycline, oxytetracycline, chlortetracycline, penicillin, erythromycin, streptomycin, dihydrostreptomycin, and the like when the antibiotic is combined with the vitamins mentioned above together with a water-soluble corticosteroid of the invention.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A sterile, water-soluble powder adapted for extemporaneous preparation of a stable aqueous solution for intravenous administration comprising a pharmacologically acceptable, water-soluble salt of a member selected from the group consisting of prednisone hemisuccinate and prednisolone hemisuccinate coprecipiated with a neutral buffer by lyophilization of a sterile neutral aqueous solution thereof, said neutral buffer being a pharmacologically acceptable salt of an acid having a pKa of about 6.5 to 8.0, the cation of which is the same as that of the pharmacologically acceptable water-soluble salt of said member.

2. A sterile, water-soluble powder adapted for extemporaneous preparation of a stable aqueous solution for intravenous administration comprising the sodium salt of a member selected from the group consisting of prednisone hemisuccinate and prednisolone hemisuccinate, coprecipitated with a neutral buffer by lyophilization of a sterile neutral aqueous solution thereof, said neutral buffer being a sodium salt of an acid having a pKa of about 6.5 to 8.0.

3. A method for the extemporaneous treatment of acute adrenocortical insufficiency, which comprises intravenously injecting to a patient suffering from acute adrenocortical insufficiency a stable sterile solution comprising (1) a pharmacologically acceptable water-soluble salt of a member selected from the group consisting of prednisone hemisuccinate and prednisolone hemisuccinate, (2) a neutral buffer salt of an acid having a pKa of about 6.5 to 8, the cation of which is the same as that of the pharmacologically acceptable water-soluble salt of said member, and (3) a sterile aqueous vehicle.

4. A method for the extemporaneous treatment of acute adrenocortical insufficiency, which comprises intravenously injecting to a patient suffering from acute adrenocortical insufficiency a stable sterile solution comprising (1) a member selected from the group consisting of prednisone hemisuccinate sodium salt and prednisolone hemisuccinate sodium salt, (2) a sodium phosphate buffer adjusted to a pH of about 6.5 to 8, and (3) a sterile aqueous vehicle.

References Cited by the Examiner

UNITED STATES PATENTS

| 2,183,589 | 12/39 | Reichstein | 260—397.45 |
| 2,656,366 | 10/53 | Minlon | 260—397.45 |
| 2,871,160 | 1/59 | Johnson et al. | 167—77 |
| 3,134,718 | 5/64 | Nobile | 167—65 |

OTHER REFERENCES

Cortone and Hydrocortone News, No. 15, Merck and Co., April 1953, 15 pages.

Drug and Cosmetic Industry, Feb. 1953, page facing page 200.

Fried et al., J.A.C.S., 76, pp 1455–1456, March 1954.

Vischer et al., Experientia, 9, 371–372 (1953).

Vischer et al. Helv. Chim. Acta, 38, 835–840 (1955).

FRANK CACCIAPAGLIA, Jr., Primary Examiner.

WILLIAM B. KNIGHT, MORRIS O. WOLK, Examiners.